March 2, 1926.  1,575,020
G. S. TURNER ET AL
COMPOSITE GEAR
Filed March 23, 1921
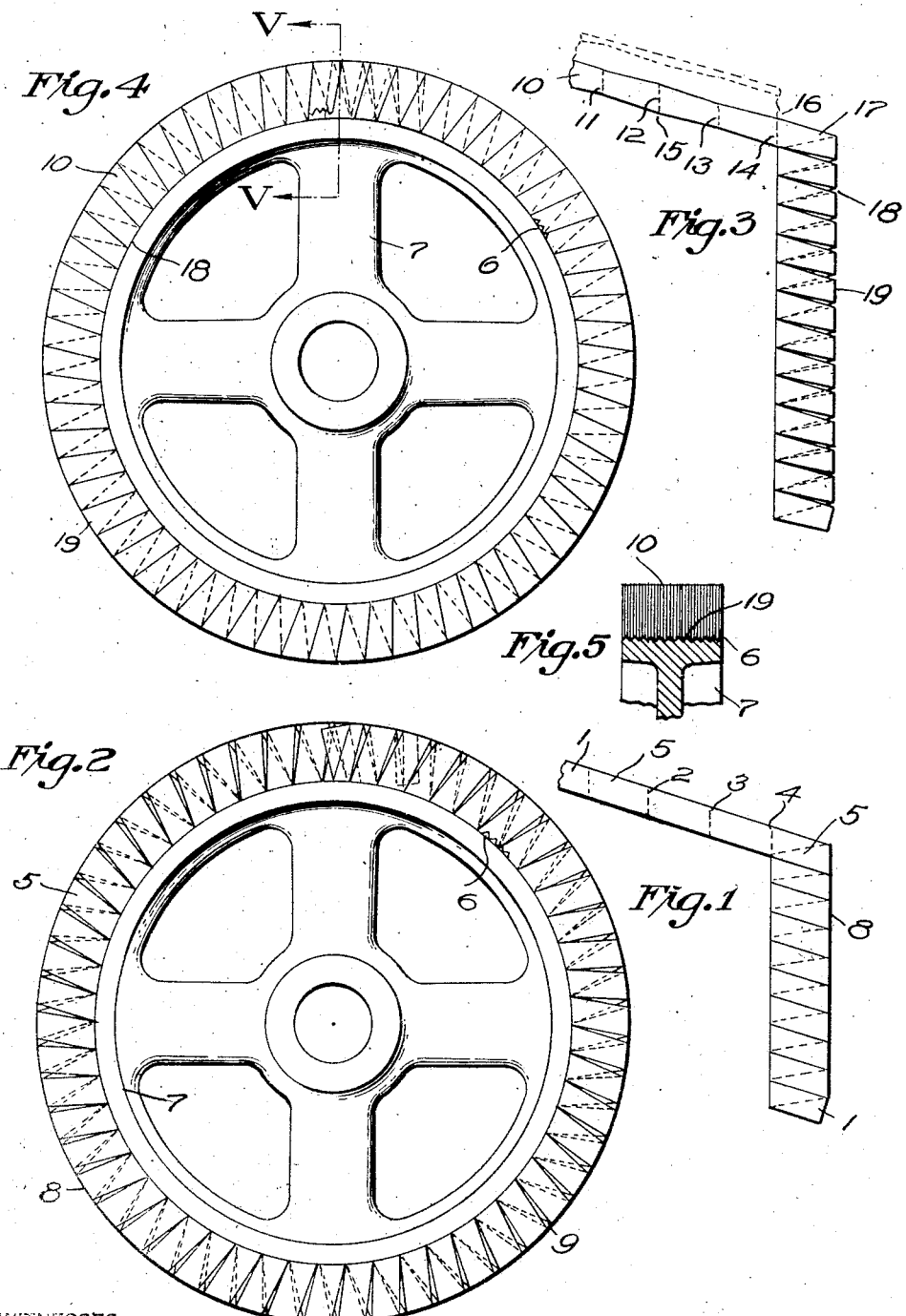
WITNESSES:
R. S. Harrison
W. B. Jaspert
INVENTOR
George S. Turner and
Benjamin J. Gudge,
BY
Wesley G. Carr
ATTORNEY Patented Mar. 2, 1926.

1,575,020

UNITED STATES PATENT OFFICE.

GEORGE S. TURNER, OF EDGEWOOD PARK, AND BENJAMIN J. GUDGE, OF WILKINS-BURG, PENNSYLVANIA, ASSIGNORS TO WESTINGHOUSE ELECTRIC AND MANUFACTURING COMPANY, A CORPORATION OF PENNSYLVANIA.

COMPOSITE GEAR.

Application filed March 23, 1921. Serial No. 454,732.

*To all whom it may concern:*

Be it known that we, GEORGE S. TURNER, a citizen of the United States, and a resident of Edgewood Park, in the county of Allegheny and State of Pennsylvania, and BENJAMIN J. GUDGE, a citizen of the United States, and a resident of Wilkinsburg, in the county of Allegheny and State of Pennsylvania, have invented a new and useful Improvement in Composite Gears, of which the following is a specification.

Our invention relates to composite articles, more especially to articles comprising a metallic central portion and a non-metallic working portion and adapted for use as machine elements such as gears, pulleys, friction wheels and the like for noiseless transmission of power.

It has been proposed to form such articles by a method which comprises providing a mold, placing a metallic member the outer surface of which is roughened by knurling or grooving in the matrix thereof, assembling sectors or rings, punched or cut from sheets of fibrous material impregnated with a binder, in the matrix of the mold about the periphery of the metallic member and applying heat and pressure to form a unitary mass.

In forming the sectors or rings from sheets, approximately 40% of the material is wasted, and, in assembling them in the molds, considerable manual labor is involved. A further difficulty is in that a large number of expensive molds are required to permit continuous operation.

Our invention obviates these difficulties, it being among the objects thereof to produce composite articles efficiently and without waste.

In accordance with our invention, we employ a strip of suitable fibrous material, such as cotton, duck, paper, asbestos, leather, felt, or other sheet material impregnated with a suitable binder. We form such strips into flat layers of contiguous sections, either by folding said strip upon itself or by winding it helically and then pressing it flat. We may wind or deposit layers of such material about the knurled surface of a metallic member by superposing the formed layers helically a sufficient number of times to produce a predetermined thickness in the finished article. The assembled materials are placed in a mold, and heat and pressure are applied to compact it, forming a unitary mass in intimate engagement with the metallic member. The resulting article is then ready for machining into gears or other machine elements.

In the accompanying drawings forming a part hereof and in which similar reference characters designate similar parts, Fig. 1 is a view of a strip of fibrous material formed into a layer of contiguous sections;

Fig. 2 is a plan view of a metallic member having a formed layer of fibrous material assembled thereon ready for molding;

Fig. 3 is a view of a strip of varying width formed into a helically wound layer;

Fig. 4 is a plan view of a metallic member having a formed layer of fibrous material of varying width assembled thereon ready for molding, and Fig. 5 is a sectional view on line V—V of Fig. 4.

A strip 1 of fibrous material, such as woven, felted or matted fabric, including cotton, duck, paper, asbestos, leather and the like, impregnated with a soluble fusible binder, such as phenolic condensation product, is folded at the equally spaced diagonal lines of fold 2, 3 and 4 forming an endless helical layer of sections 5. This folded strip of fibrous material is superposed helically around the knurled surface 6 of a metallic member 7 to provide a suitable number of layers and form an article of predetermined thickness. The formed strip is wound edgewise about the member 7 causing the outer edges 8 of the sections 5 to separate, leaving spaces or slits 9 on the outer face of the article.

We provide a mold which comprises a ring or matrix in which the assembled structure is placed. A pressure plate is fitted into said matrix to close the mold which is inserted between the platens of a hydraulic press. Heat and pressure are applied to fuse the binder, softening the material and compacting it, forcing the fibres into the interstices of the knurled surface 6. The heating and pressure are continued to harden the binder forming an insoluble, infusible mass integral with the member 7.

In the embodiment of our invention shown in Figs. 3 to 5, we provide a strip 10 varying in width at the equally spaced diagonal lines of fold 11, 12, 13 and 14, alternate folds, as 11 and 13, being narrower than 12 and 14. Said strip is folded along the equal spaced diagonal lines so that the end 15 of the wide line of fold 12 will fall along the opposite end 16 of the alternate wide line of fold 14, forming a flat endless spiral layer of sections 17 having openings 18 along the edge 19 thereof.

This wound strip 10 is superposed around the knurled surface 6 of the member 7 in helical layers with the side 19 having the openings 18 adjacent to the knurled surface 6, forming an endless layer of contiguous sections which, when molded as described above, forms a structure of uniform density and composition.

Although we have described a specific method of forming composite articles having a metallic central body portion, it is to be understood that our invention is not limited to the details set forth as changes may be made in the structure without departing from the principles thereof. For instance, we may substitute any suitable binder for the phenolic condensation product, or the fibrous strips of material may be so shaped that when folded along straight fold lines, a layer of contiguous sections will be formed, or a central portion of any suitable material may be employed.

We claim as our invention:

1. A method of forming composite articles which comprises providing a strip of fibrous material impregnated with a binder, said strip having wide and narrow portions, folding said strip on its wide and narrow portions to form a flat helix of contiguous sections with corresponding folds on one side, disposing said helix around the outer periphery of a metallic member with the narrow folds adjacent to its outer periphery and applying heat and pressure thereto to form a unitary mass.

2. A method of forming composite articles which comprises providing a strip of fibrous material impregnated with a binder, said strip having wide and narrow portions, folding said strip on its wide and narrow portions to form a flat helix of contiguous sections with corresponding folds on one side, winding said folded strip helically around the outer periphery of a metallic member with the narrow folds adjacent to its outer periphery and applying heat and pressure thereto to form a unitary mass.

3. A method of forming composite articles which comprises providing a strip of fibrous sheet material impregnated with a binder, said strip having wide and narrow portions, folding said strip on its wide and narrow portions to form a flat helix of contiguous sections with corresponding folds on one side, winding said folded strip helically around the outer periphery of a metallic member with the narrow folds adjacent to its outer periphery and applying heat and pressure thereto to form a unitary mass.

4. A method of forming composite articles which comprises providing a strip of woven textile fabric impregnated with a binder, said strip having wide and narrow portions, folding said strip on its wide and narrow portions to form a flat helix of contiguous sections with corresponding folds on one side, winding said folded strip helically around the outer periphery of a metallic member with the narrow folds adjacent to its outer periphery and applying heat and presure thereto to form a unitary mass.

In testimony whereof, we have hereunto subscribed our names this 14th day of March, 1921.

GEORGE S. TURNER.
BENJAMIN J. GUDGE.